United States Patent
Yamashita

(10) Patent No.: US 8,005,354 B2
(45) Date of Patent: Aug. 23, 2011

(54) IMAGE PICKUP APPARATUS, LIGHT EMISSION DEVICE, AND IMAGE PICKUP SYSTEM

(75) Inventor: Tomoya Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/749,084

(22) Filed: Mar. 29, 2010

(65) Prior Publication Data

US 2010/0254693 A1 Oct. 7, 2010

(30) Foreign Application Priority Data

Apr. 1, 2009 (JP) ................................. 2009-089064

(51) Int. Cl.
*G03B 17/00* (2006.01)
*G03B 15/03* (2006.01)

(52) U.S. Cl. ............................ 396/56; 396/161; 396/182

(58) Field of Classification Search .................... 396/56, 396/155, 157–159, 161, 164, 166, 167, 182, 396/201–203; 348/370–371; 362/3, 5
See application file for complete search history.

(56) References Cited

U.S. PATENT DOCUMENTS 6,404,987 B1   6/2002  Fukui
7,783,188 B2 * 8/2010  Clark ............................ 396/198

FOREIGN PATENT DOCUMENTS

JP        2000-089307          3/2000

* cited by examiner

*Primary Examiner* — W. B. Perkey
*Assistant Examiner* — Minh Q Phan
(74) *Attorney, Agent, or Firm* — Cowan, Liebowitz & Latman, P.C.

(57) ABSTRACT

An image pickup apparatus capable of obtaining a satisfactory picked up image, even if a light emission device cannot emit the requested light amount. When notified that at least one of slave flash devices is unable to emit a set amount of light, a master flash device recalculates amounts of light emission of the flash devices based on a possible light emission amount of a flash device having a maximum deficiency of light amount relative to a set light emission amount, thereby maintaining light amount ratios at the time of multiple flash photographing.

7 Claims, 10 Drawing Sheets

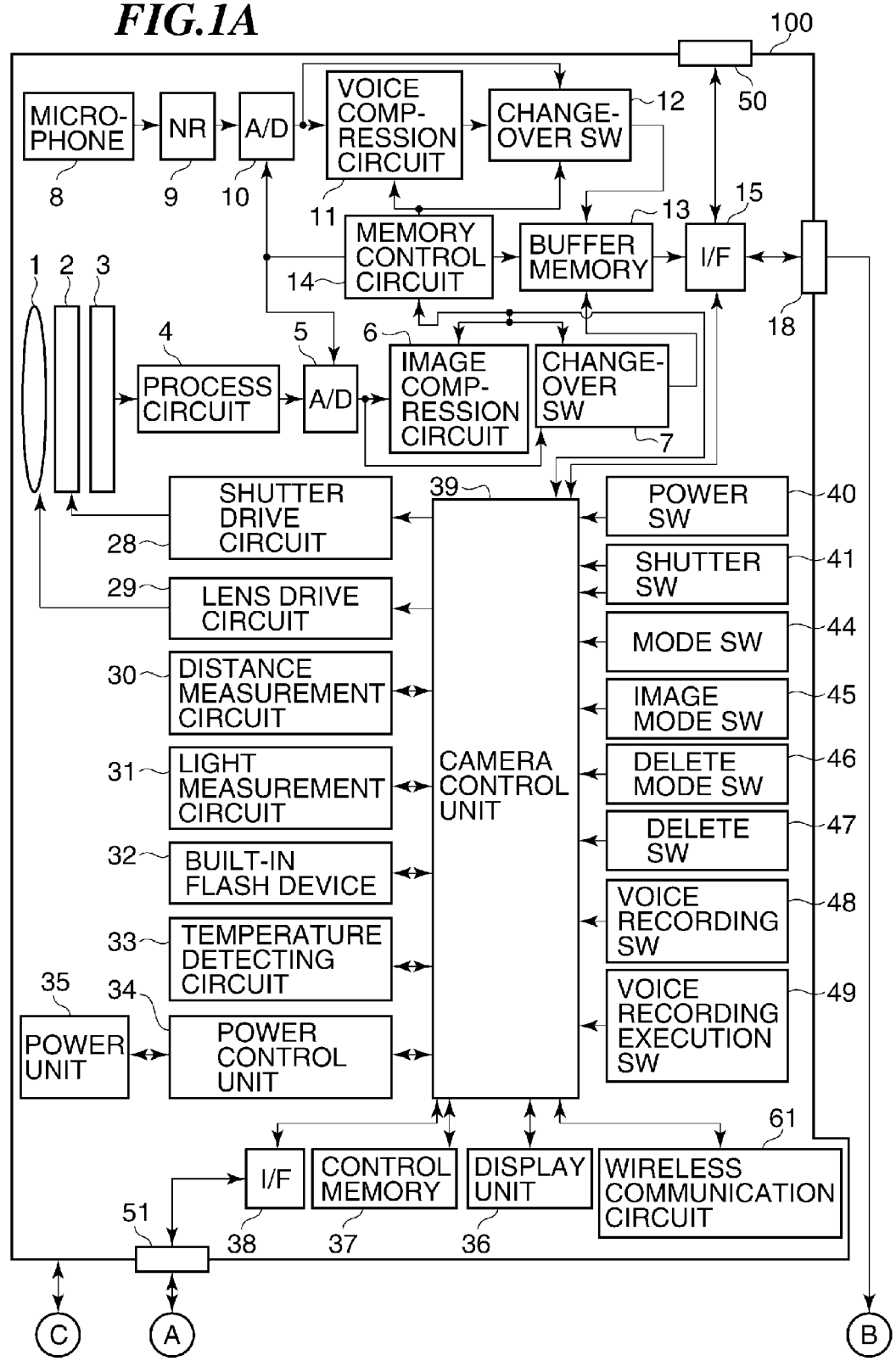

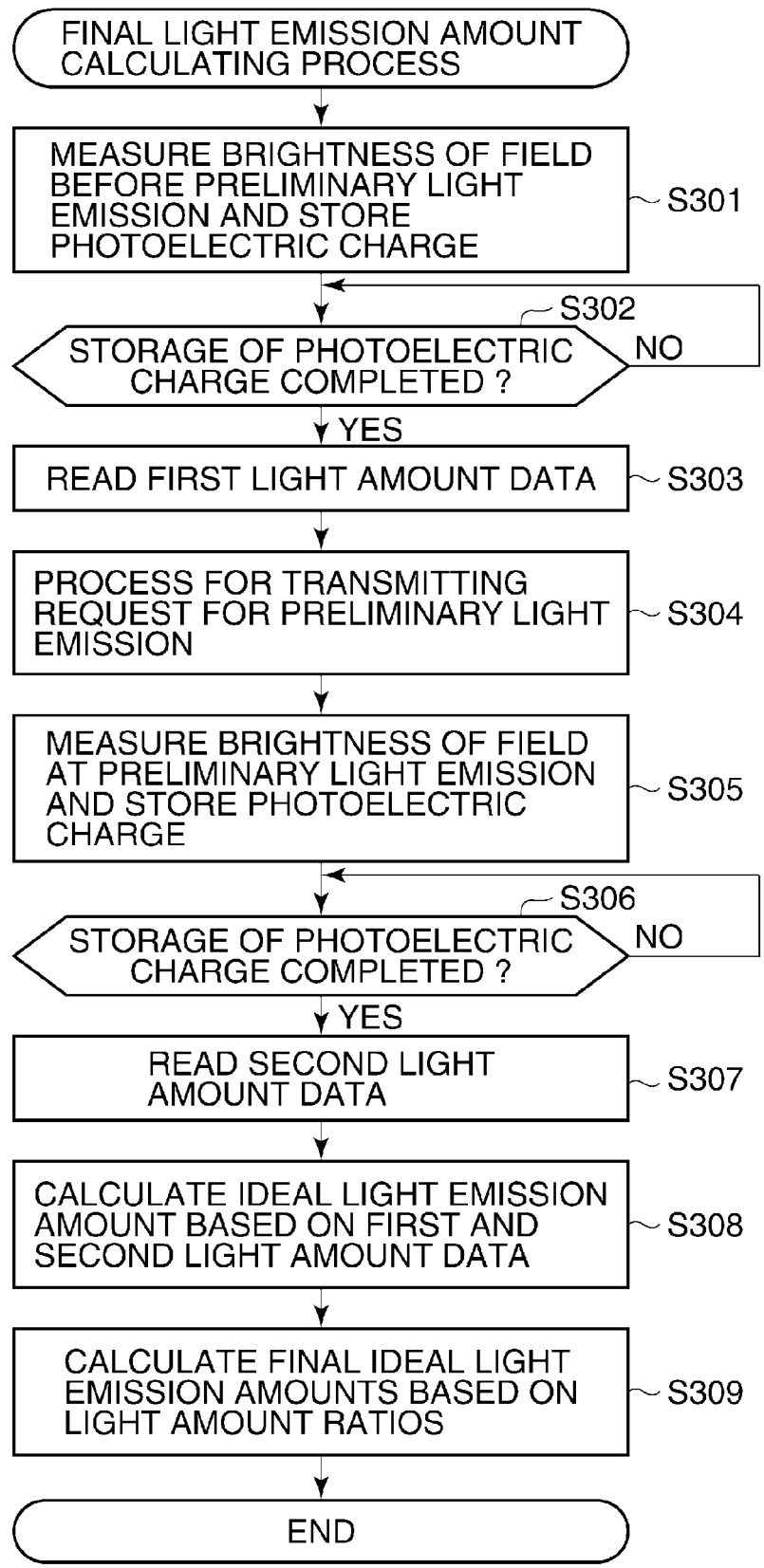

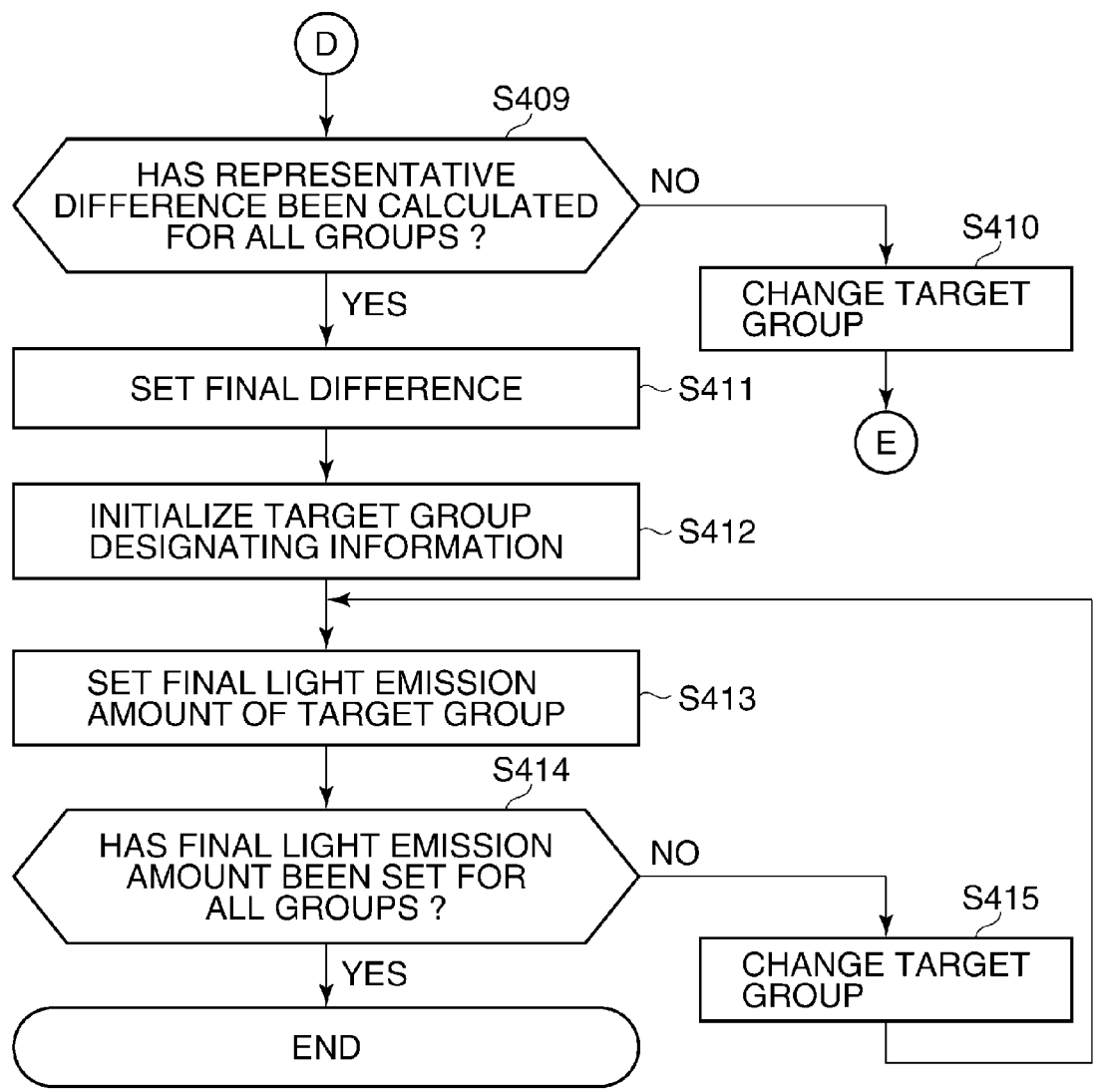

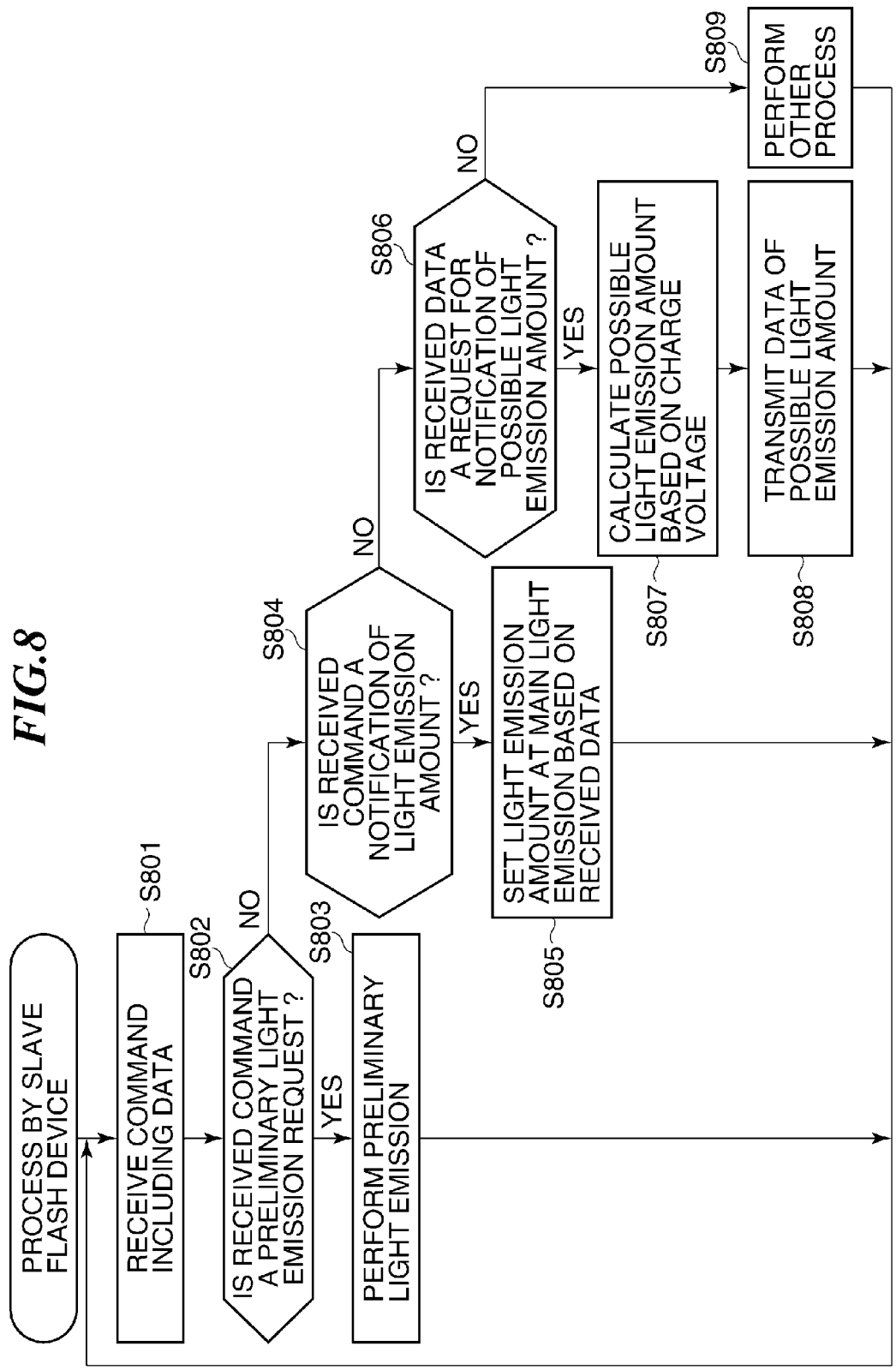

IMAGE PICKUP APPARATUS, LIGHT EMISSION DEVICE, AND IMAGE PICKUP SYSTEM

BACKGROUND OF THE INVENTION

1. Field of the Invention

The present invention relates to a technique for controlling an amount of light emitted from a light emission device of an image pickup apparatus.

2. Description of the Related Art

Conventionally, there has been known a technique for controlling amounts of light emitted from flash devices during photographing using a master flash device directly coupled to a camera and at least one slave flash device disposed apart from the master flash device (see, Japanese Laid-open Patent Publication No. 2000-89307).

In this technique, unidirectional communication from the master flash device to the slave flash device is used for control of light emission.

Therefore, even if the slave flash device cannot emit the amount of light requested by the master flash device at multiple flash photographing, the master flash device cannot recognize that fact. As a result, photographing cannot be performed at light amount ratios between the flash devices set by the user, making it difficult to obtain a picked-up image intended by the user.

SUMMARY OF THE INVENTION

The present invention provides an image pickup apparatus capable of obtaining a satisfactory picked up image even if a light emission device cannot emit the requested amount of light, and provides a light emission device for the image pickup apparatus and an image pickup system including the image pickup apparatus.

According to a first aspect of this invention, there is provided an image pickup apparatus adapted for bi-directional communication with a plurality of light emission devices via a communication unit, which comprises a light measurement unit configured to measure object brightness, a first calculation unit configured to calculate first light emission amounts of the plurality of light emission devices based on a result of measurement by the light measurement unit, an acquisition unit configured to acquire data representing possible amounts of light emission of the plurality of light emission devices, a second calculation unit configured, in a case where the plurality of light emission devices include one whose possible amount of light emission represented by the data acquired by the acquisition unit is smaller than the first light emission amount, to calculate second light emission amounts at which light amount ratios of the plurality of light emission devices become equal to light amount ratios at the first light emission amounts, based on the possible amount of light emission smaller than the first light emission amount and having a maximum difference from the first light emission amount, and a control unit configured, in a case where the plurality of light emission devices include one whose possible amount of light emission is smaller than the first light emission amount, to control the plurality of light emission devices so as to emit light at the second light emission amounts.

According to a second aspect of this invention, there is provided a light emission device adapted for bi-directional communication with a plurality of light emission devices via a communication unit, which comprises a light emission unit, a light emission control unit configured to control light emission of the light emission unit, a connection unit configured to be connected to an image pickup apparatus, a transmission unit configured to transmit to the plurality of light emission devices a request from the image pickup apparatus connected to the connection unit, and a reception unit configured to receive, from the plurality of light emission devices, data representing possible amounts of light emission of respective ones of the plurality of light emission devices, wherein the transmission unit transmits, to the plurality of light emission devices, data representing light emission amounts calculated based on the data representing the possible amounts of light emission received by the reception unit from the plurality of light emission devices, and the light emission control unit causes the light emission unit to emit light, in synchronism with light emissions of the plurality of light emission devices, at a light emission amount calculated based on the possible amounts of light emission.

According to a third aspect of this invention, there is provided an image pickup system having a plurality of light emission devices adapted for bi-directional communication with an image pickup apparatus via a communication unit, which comprises a light measurement unit configured to measure object brightness, a first calculation unit configured to calculate first light emission amounts of the plurality of light emission devices based on a result of measurement by the light measurement unit, an acquisition unit configured to acquire data representing possible amounts of light emission of the plurality of light emission devices, a second calculation unit configured, in a case where the plurality of light emission devices include one whose possible amount of light emission represented by the data acquired by the acquisition unit is smaller than the first light emission amount, to calculate second light emission amounts at which light amount ratios of the plurality of light emission devices become equal to light amount ratios at the first light emission amounts, based on the possible amount of light emission smaller than the first light emission amount and having a maximum difference from the first light emission amount, and a control unit configured, in a case where the plurality of light emission devices include one whose possible amount of light emission is smaller than the first light emission amount, to control the plurality of light emission devices so as to emit light at the second light emission amounts.

With this invention, it is possible to obtain a satisfactory picked up image even if the requested amount of light cannot be emitted from a light emission device.

Further features of the present invention will become apparent from the following description of an exemplary embodiment with reference to the attached drawings.

BRIEF DESCRIPTION OF THE DRAWINGS

FIGS. 1A and 1B are a block diagram showing the construction of an electronic still camera according to one embodiment of this invention;

FIG. 3 is a flowchart showing a process for calculating an ideal light emission amount in S203 in FIG. 2;

FIGS. 4A and 4B are a flowchart showing a process for calculating a final light emission amount of each group in S209 in FIG. 2;

FIG. 8 is a flowchart showing a process performed by each of slave flash devices.

DETAILED DESCRIPTION OF THE PREFERRED EMBODIMENT

The present invention will now be described in detail below with reference to the drawings showing a preferred embodiment thereof.

Figure 1B:
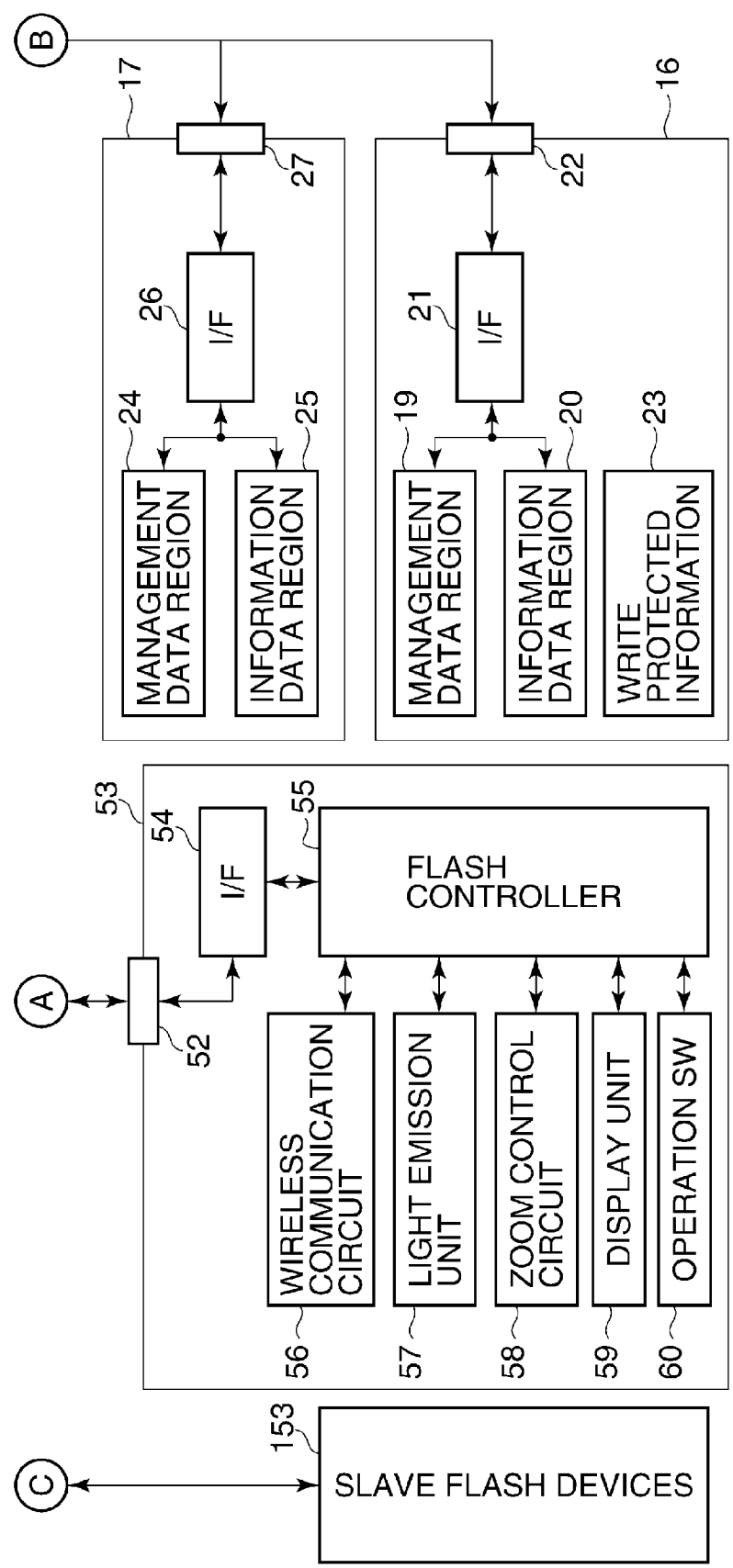

FIGS. 1A and 1B show in block diagram the construction of an image pickup apparatus according to one embodiment of this invention. The image pickup apparatus is configured as an electronic still camera (hereinafter referred to as the camera body) 100 and constitutes a main part of an image pickup system. The image pickup system includes, in addition to the camera body 100, an external flash device 53 as an external light emission device and a memory card 16 and a hard disk 17 as external storage media.

The image pickup system further includes a plurality of slave flash devices schematically and collectively shown by a block 153 in FIG. 1B, so that multiple flash photographing can be performed. The slave flash devices 153 are basically the same in construction as the flash device 53. The camera body 100, the external flash device 53, and the slave flash devices 153 are able to perform bi-directional wireless communication with one another.

As shown in FIG. 1A, the camera body 100 includes a taking lens 1, a shutter 2 having a diaphragm function, an image pickup device 3 including, e.g., a CCD for photoelectrical conversion of an optical object image, and a process circuit 4 for camera signal processing such as gamma correction. Reference numeral 5 denotes an A/D converter for converting an analog image signal output from the process circuit 4 into a digital signal, and 6 denotes an image compression circuit for compressing/expanding image data by, e.g., adaptive discrete cosine transformation (ADCT). Reference numeral 7 denotes a changeover switch for selecting to transfer image data compressed by the image compression circuit 6 or selecting to transfer uncompressed image data bypassing the image compression circuit 6.

Reference numeral 8 denotes a microphone for inputting external voice, 9 denotes a noise reduction circuit for reducing noise in a voice signal output from the microphone 8, and 10 denotes an A/D converter for converting an analog output signal from the noise reduction circuit 9 into a digital signal. Reference numeral 11 denotes a voice compression circuit for compressing/expanding voice data by, e.g., adaptive differential PCM (ADPCM), and 12 denotes a changeover switch for selecting to transfer voice data compressed by the voice compression circuit 11 or selecting to transfer uncompressed voice data bypassing the voice compression circuit 11. Reference numeral 13 denotes a buffer memory for temporarily storing image data (video signal) and/or voice data (voice signal). Data stored in the buffer memory 13 is read by a memory control circuit 14.

The memory control circuit 14 controls the A/D converters 5 and 10, the image compression circuit 6, the voice compression circuit 11, the changeover switches 7 and 12, and the buffer memory 13. In a case where image data is compressed, the memory control circuit 14 writes the compressed image data from the image compression circuit 6 into the buffer memory 13. In the case of no compression, the memory control circuit 14 writes image data output from the A/D converter 5 into the buffer memory 13. In a case that voice data is compressed, the memory control circuit 14 writes the compressed voice data from the voice compression circuit 11 into the buffer memory 13. In the case of no compression, the memory control circuit 14 writes voice data output from the A/D converter 10 into the buffer memory 13.

Reference numeral 15 denotes a memory I/F unit that provides an interface with the memory card 16 and the hard disk 17, and reference numeral 18 denotes a connector on the camera body side for establishing electrical connection between the camera body 100 and the memory card 16 or between the camera body 100 and the hard disk 17.

The memory card 16 has a recording region that includes a management data region 19 and an information data region 20 both accessed from the camera body 100 via an interface 21 and a connector 22 which are on the memory card side. Write protected (write inhibited) information 23 can also be read by the camera body 100 via the interface 21 and the connector 22.

The interface 21 is comprised of, e.g., a control circuit (such as CPU or MPU), a non-volatile memory (such as ROM or EEPROM), and a RAM (Ditto in an interface 26), and controls the memory card 16 according to a predetermined program.

The hard disk 17 has a storage area including a management data region 24 and an information data region 25, which are accessed from the camera body 100 via the interface 26 and a connector 27.

Figure 6:
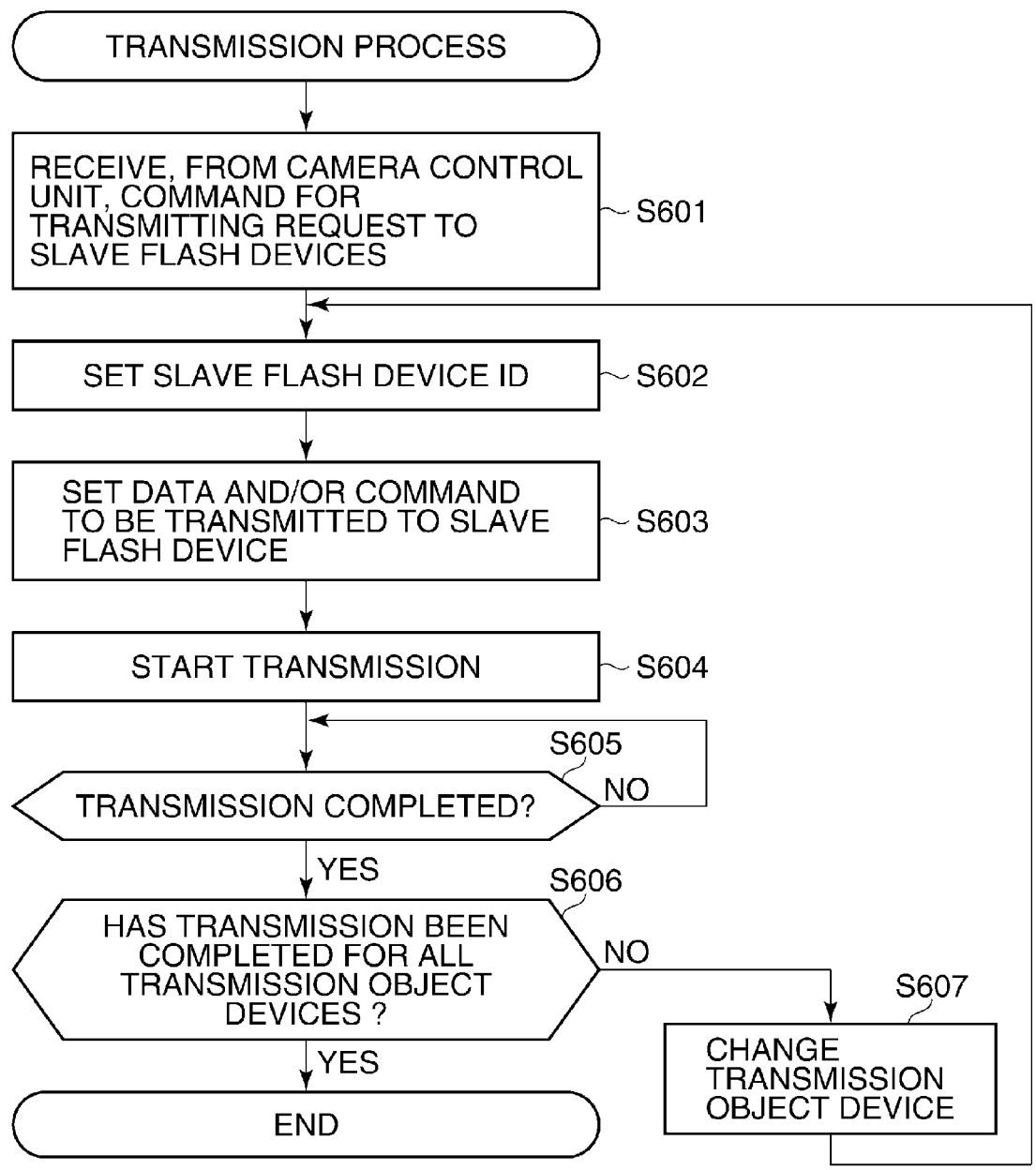
FIG. 6 is flowchart showing a transmission process in S206, S211, and S213 in FIG. 2.
Figure 7:
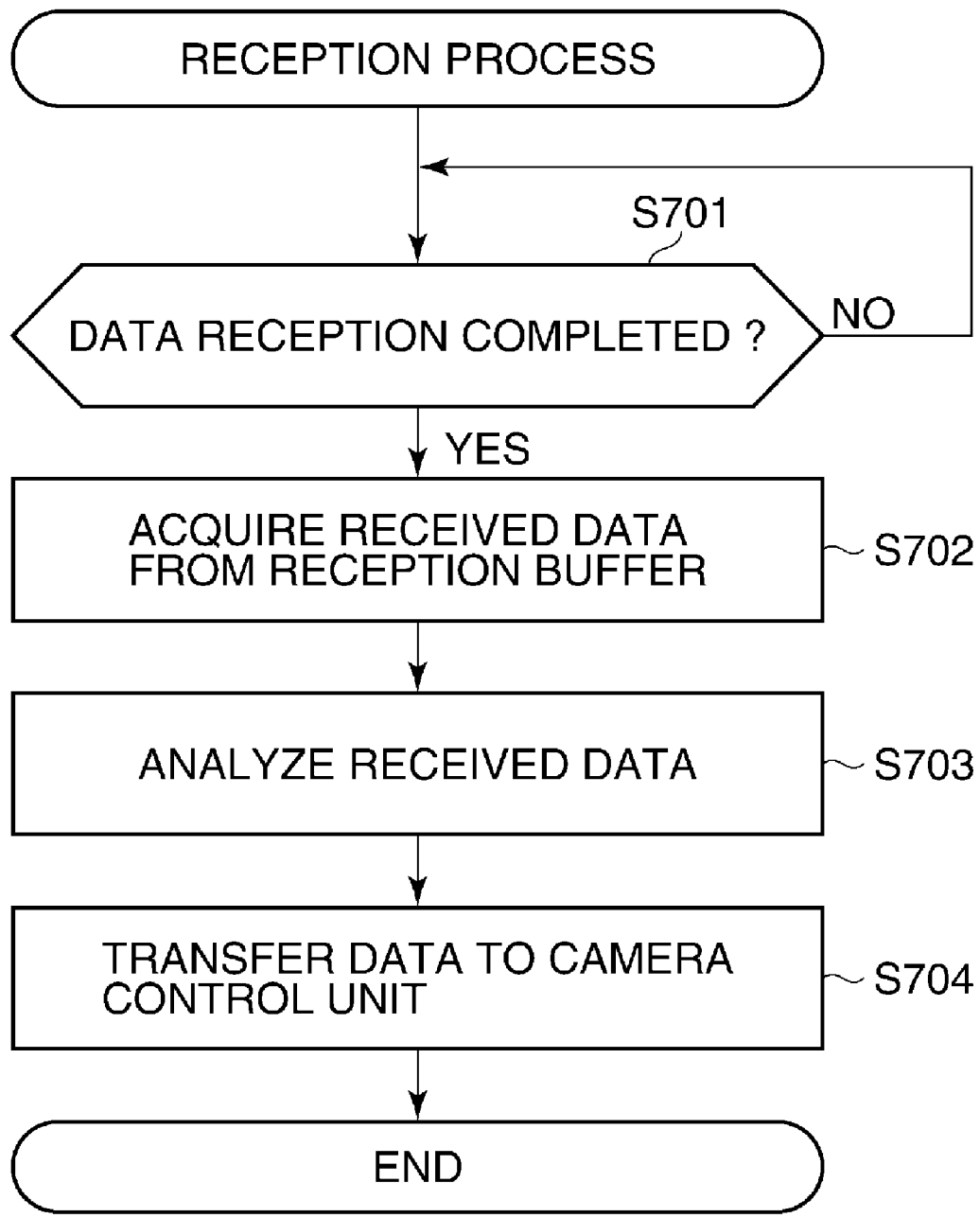
FIG. 7 is a flowchart showing a reception process in S207 in FIG. 2.

It should be noted that an application program relating to FIGS. 2 to 5 (described later) peculiar to this embodiment is stored in the memory card 16 or in the hard disk 17 and is optionally provided, whereby the increase in the price of the camera body and the flash device is avoided, taking into account of a user who does not use a strobe-photographing function. On the other hand, an application program relating to transmission/reception (bi-directional communication) shown in FIGS. 6 and 7 is installed on the master flash device 53 (Ditto in the slave flash devices 153).

Reference numeral 28 denotes a shutter drive circuit for driving the shutter 2; 29 denotes a lens drive circuit for driving a focus lens of the taking lens 1; 30 denotes a distance measurement circuit for measuring a distance to object; 31 denotes a light measurement circuit for measuring a brightness of object; and 32 denotes a built-in flash device. Reference numeral 33 denotes a temperature detecting circuit that detects a recording medium temperature and the presence/absence of freezing or dew condensation.

Reference numeral 34 denotes a power control unit for detecting and controlling a state of power source, and 35 denotes a power unit comprised of a battery, a DC-DC converter, a switch for selecting a block to be energized, etc. The power control unit 34 detects battery attachment/detachment, battery type, and battery residual capacity, and controls the power unit 35 based on detection results and instructions supplied from the camera control unit 39.

The camera control unit 39 is comprised of, e.g., a control circuit (such as CPU or MPU), a non-volatile memory (such as ROM or EEPROM), and RAM, and controls operations of the camera body 100 according to a predetermined program. The CPU of the camera control unit 39 controls operations of the external flash device 53 according to a program stored in the ROM.

Reference numeral 36 denotes a display unit for displaying various camera information, picked-up image, menu items, etc., 37 denotes a control memory that stores constants and variables for use by the camera control unit 39 to perform a photographing operation, and 38 denotes a flash I/F unit that provides an interface with the external flash device 53.

The following switches for giving operation instructions to the camera control unit 39 are connected to the unit 39. Reference numeral 40 denotes a power switch for turning on the power source.

A shutter switch 41 is comprised of a first switch SW1 configured to be ON by a first stroke of the switch 41 and a second switch SW2 configured to be ON by a second stroke of the switch 41.

When the first switch SW1 is made ON, the distance measurement circuit 30 starts a distance measurement process and the light measurement circuit 31 starts a light measurement process. A preparatory process for flash light emission (described later) peculiar to this embodiment is also started, if a flash mode (strobe mode), described later, is set. When the second switch SW2 is made ON, a photographing process is started. In that case, the shutter is released in a state that strobe light (flash light) is emitted, if the flash mode is set. Picked-up image data is recorded into the memory card 16 or the hard disk 17.

Reference numeral 44 denotes a mode switch for selecting a desired mode from among various modes, which include a single mode where a single image or a single set of images is photographed, a continuous mode where a plurality of images or plural sets of images are continuously photographed, a self-timer photographing mode, and a flash mode for performing strobe photographing (flash-photographing).

Reference numeral 45 denotes an image mode switch for selecting image recording methods such as the number of images to be recorded, a determination of frame recording/field recording, aspect ratio, pixel, compression system, compression ratio, etc. It should be noted that the image mode switch 45 is shown in FIG. 1A as being comprised of a single switch, but is actually comprised of a plurality of switches.

Reference numeral 46 denotes a delete mode switch for selecting a delete mode, 47 denotes a delete switch for giving a delete instruction, 48 denotes a voice recording switch for designating ON/OFF of voice recording, and 49 denotes a voice recording execution switch for giving a voice recording execution instruction.

The camera control unit 39 controls the entire camera based on, e.g., instruction signals from the above-described switches and detection signals on the type and state (e.g., residual storage capacity) of a recording medium attached to the camera body 100. For example, based on a result of distance measurement by the distance measurement circuit 30, the camera control unit 39 causes the lens drive circuit 29 to drive a focus lens of the taking lens 1, thereby controlling the taking lens 1 into an in-focus state. Based on a result of light measurement by the light measurement circuit 31, the camera control unit 39 decides a release time of the shutter 2 by the shutter drive circuit 28, thereby controlling an amount of exposure to an optimal exposure amount.

Reference numeral 50 denotes a connector for connection with external equipment, 61 denotes a wireless communication circuit for bi-directional wireless communication with external equipment, and 51 denotes a connector for connection with the external flash device 53. Reference numeral 52 denotes a connector as a connection unit of the external flash device 53. To connect the external flash device 53 to the camera body 100, the connector 52 is connected to the connector 51 of the camera body 100. Reference numeral 54 denotes an I/F unit that provides an interface with the camera body 100.

In a state connected with the camera body 100 via the connectors 51 and 52, the external flash device 53 functions as a master flash device (described later). Thus, the external flash device 53 will be called the master flash device M, where appropriate. The slave flash devices 153 each have a bi-directional wireless communication function and are disposed apart from the camera body 100.

In this embodiment, it is assumed to perform multiple flash photographing by using the slave flash devices 153. These slave flash devices 153 are divided into groups. In this embodiment, it is assumed that power sources of the master flash device M and the slave flash devices 153 are each implemented by a secondary battery.

Reference numeral 55 denotes a flash controller that controls operations of the external flash device 53. The flash controller 55 is comprised of, e.g., a control circuit (such as CPU or MPU), a non-volatile memory (such as ROM or EEPROM), and a RAM. The CPU controls various operations of the external flash device 53 according to a program stored in the ROM. For example, the CPU controls light emission of a light emission unit 57 such that the unit 57 emits light in synchronism with light emissions by the slave flash devices 153. Application programs relating to processes in FIGS. 5 and 6 (described later) are also stored in the ROM.

Reference numeral 56 denotes a wireless communication circuit for bi-directional wireless communication with the slave flash devices, 57 denotes the light emission unit for emitting strobe light (flash light), 58 denotes a zoom control circuit for zoom control of the light emission unit 57, 59 denotes a display unit for displaying setting states of the external flash device 53, and 60 denotes an operation switch of the external flash device 53.

In this embodiment, it is assumed that the master flash device M (shown at 53 in FIG. 1) and the slave flash devices (collectively shown at 153 in FIG. 1) have the same capability of strobe light emission (flash light emission) as one another. The flash devices are divided into groups such that the master flash device M belongs to any one of the groups and there may be a group to which only one slave flash device 153 belongs. It is also assumed that the user sets light amount ratios on a per group basis by operating, e.g., the mode switch 44 of the camera body 100.

Next, with reference to a flowchart of FIG. 2, a description will be given of the outline of a preparatory process for flash light emission, which is performed by the camera control unit 39.

In the preparatory process for flash light emission, the camera control unit 39 determines whether an ON signal is input from the first shutter SW1 or from an FE lock button, to thereby determine whether a timing to start preliminary light emission is reached (S201). If the start timing of preliminary light emission is reached, the camera control unit 39 initializes information designating a target group (S202), the target group being sequentially selected from among flash device groups.

After completion of photometrical measurement by the light measurement circuit 31, the camera control unit 39 requests, via the flash controller 55 of the master flash device M, flash devices of the target group to perform preliminary light emission. If the target group includes the master flash device M, the control unit 39 requests the master flash device M to perform preliminary light emission. Then, based on results of light measurements before and at preliminary light emission, the camera control unit 39 calculates an ideal amount of light emission of the target group (S203). A process for calculating the ideal amount of light emission (first light emission amount) of the target group will be described in detail later with reference to FIG. 3.

Next, the camera control unit 39 determines whether the process for calculating the ideal amount of light emission is completed for all the groups (S204). If the answer to S204 is NO, the flow proceeds to S205 to change the target group to the next group, and returns to S203. When determining in S204 that the ideal amount of light emission has been calculated for all the groups, the camera control unit 39 requests, via the flash controller 55 of the master flash device M, all the flash devices to notify a currently possible amount of light emission (S206). A process for transmitting the request for notification will be described in detail later with reference to FIG. 6. A similar transmission process is performed also in S211 and S213.

The camera control unit 39 receives data representing the currently possible amount of light emission of each flash device via the flash controller 55 of the master flash device M, and stores the received data into the RAM (S207). Then, the control unit 39 determines whether data has been received for all the flash devices (S208). If the answer to S208 is NO, the flow returns to S207. If the answer to S208 is YES, the flow proceeds to S209. It should be noted that the data reception process in S207 will be described in detail later with reference to FIG. 7.

Next, the camera control unit 39 calculates final amounts of light emission (second light emission amounts) of respective groups (S209). The calculation process will be described in detail later based on FIGS. 4A and 4B. Next, the control unit 39 determines for each group whether there is a difference between the ideal amount of light emission and the final amount of light emission respectively calculated in S203 and S209. In other words, the control unit 39 determines whether there is a group having a deficiency of light amount relative to the ideal amount of light emission (S210).

If there is at least one group having a deficiency of light amount relative to the ideal amount of light emission, the camera control unit 39 transmits data representing the final amounts of light emission to respective ones of all the flash devices via the flash controller 55 of the master flash device M (S211). To compensate for the difference between the ideal amount of light emission and the final amount of light emission (i.e., deficiency of light amount), the camera control unit 39 again sets photographing parameters such as ISO sensitivity (S212), and completes the preparatory process for flash light emission.

On the other hand, if there is no group having a deficiency of light amount relative to the ideal amount of light emission, the camera control unit 39 transmits data representing the ideal amounts of light emission to respective ones of all the flash devices via the flash controller 55 of the master flash device M (S213), and completes the preparatory process for flash light emission.

Next, with reference to FIG. 3, a description will be given of the process in S203 in FIG. 2 (first calculation process) for calculating the ideal amount of light emission of the target group.

In the first calculation process, the camera control unit 39 photometrically measures the brightness of field (fixed light) by using the light measurement circuit 31 in a natural state where strobe light (flash light) is not emitted, and stores, for a predetermined time period, photoelectric charge generated by the fixed light (S301). At that time, the light measurement circuit 31 converts analog photoelectric charge (integrated value) generated by the fixed light into a digital brightness signal (first light amount data). When determining in S302 that storage of photoelectric charge is completed, the camera control unit 39 reads the first light amount data representing the amount of light before preliminary light emission from the light measurement circuit 31, and stores the data into the RAM (S303).

Next, the camera control unit 39 requests, via the flash controller 55 of the master flash device M, all the flash devices belonging to the target group to perform preliminary light emission (S304). In response to this, each flash device emits strobe light at the currently maximum possible light amount.

Then, the camera control unit 39 photometrically measures the brightness of field at the preliminary light emission by using the light measurement circuit 31, and stores photoelectric charge generated by the preliminary light emission (S305). When determining in S306 that storage of photoelectric charge is completed, the camera control unit 39 reads the second light amount data representing the amount of light at preliminary light emission from the light measurement circuit 31, and stores the data into the RAM (S307).

Next, the camera control unit 39 calculates an ideal amount of light emission of the target group (ideal amount of light emission of the entire target group) according to the following formula (S308).

Ideal amount of light emission=(Reference light amount difference value/Light amount difference value)×Amount of light emission at preliminary light emission.

Specifically, in S308, the first light amount data representing the amount of light generated by the fixed light is subtracted from the second light amount data representing the amount of light at the preliminary light emission, thereby calculating a difference value representing an amount of light generated by only the preliminary light emission.

Next, a reference light amount difference value is divided by the calculated light amount difference value. To this end, the reference light amount difference value (e.g., a difference value between an amount of light generated when preliminary light is emitted to a gray chart having a predetermined light reflectance and an amount of light generated by fixed light before preliminary light emission) is obtained in advance.

Finally, a value obtained by dividing the reference light amount difference value by the calculated light amount difference value is multiplied by an amount of light emission of the entire target group at preliminary light emission, thereby obtaining an ideal amount of light emission of the target group.

In this embodiment, as the amount of light emission of the target group at preliminary light emission, there is used a theoretically assumed value that represents the amount of light emission of the entire target group in a case where secondary batteries built in the flash devices of the target group are each in a fully charged state.

If, as in the case of this embodiment, the flash devices have the same ability of light emission as one another, the theoretically assumed value can be represented by a product of the amount of light emission of one flash device having a built-in secondary battery which is in a fully charged state and the numbers of the flash devices in the target group.

In this embodiment, the ideal amount of light emission of each target group is not calculated as its value itself, but calculated as a magnification factor relative to the amount of light emission at preliminary light emission. It should be noted that the ideal amount of light emission of each group can be determined by using a method other than the method used in S308.

Next, based on light amount ratios between flash devices set by the user on a per group basis, the camera control unit 39 calculates final ideal amounts of light emission of respective groups (S309). Each of the final ideal amounts of light emission is calculated as a magnification factor relative to the amount of light emission at preliminary light emission. In the calculation of the final ideal amount of light emission, the ideal amount of light emission of the group having the minimum light amount ratio is used as a reference final ideal amount of light emission. The final ideal amounts of light emission of other groups are each calculated as a magnification factor relative to the reference final ideal amount of light emission.

Figure 4A:
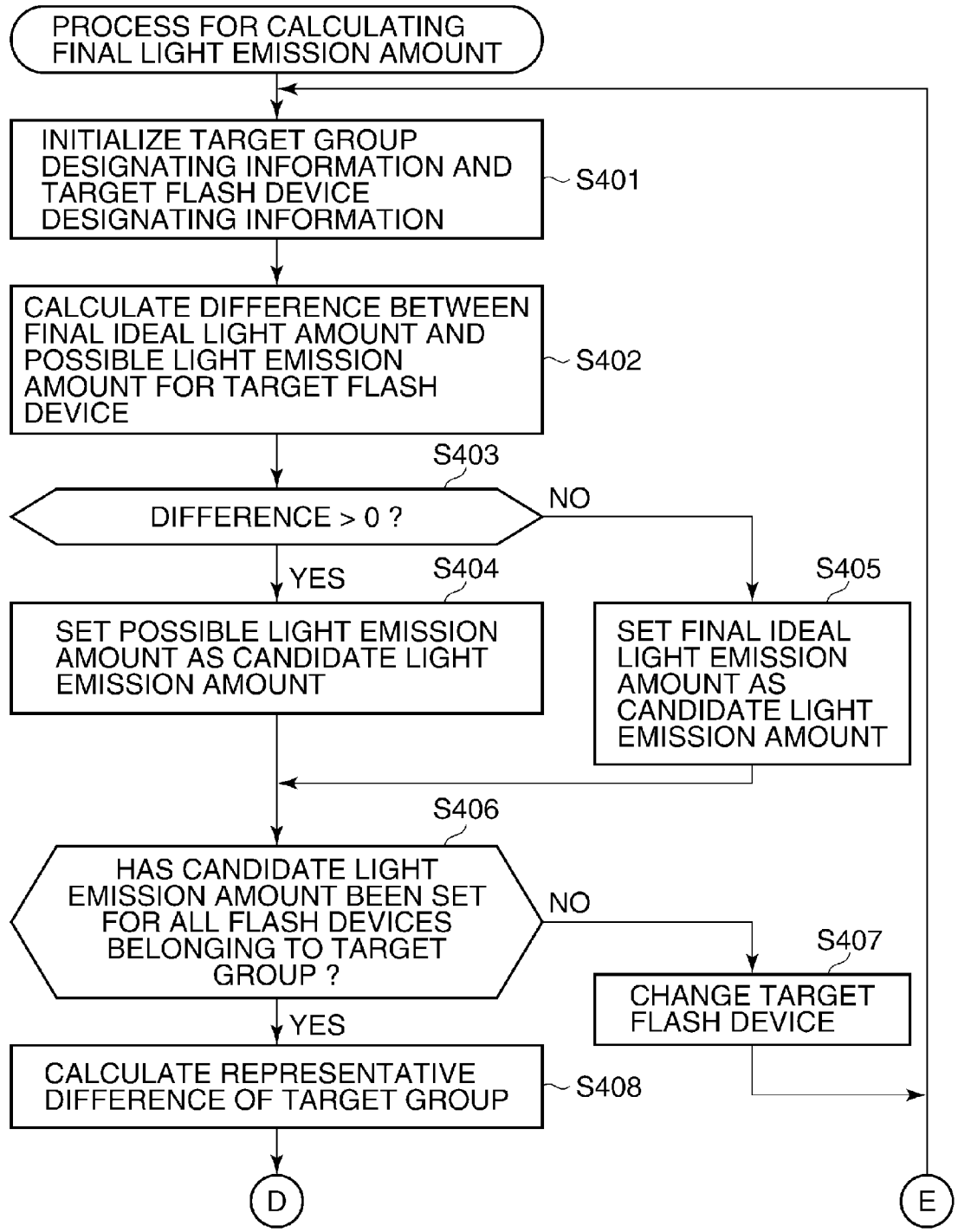

Next, with reference to a flowchart of FIGS. 4A and 4B, a detailed description will be given of the process in S209 in FIG. 2 (second calculation process) for calculating the final amounts of light emission of respective groups.

The final amounts of light emission of respective groups calculated here are based on a possible amount of light emission of a flash device, among the flash devices of all the groups, that has a maximum deficiency of light amount relative to the final ideal amount of light emission of a group to which the flash device belongs. Amounts of light used for calculating the final amount of light emission of each group are each represented by a magnification value relative to the amount of light at preliminary light emission (theoretical value).

In this embodiment, to calculate the final amounts of light emission of respective groups, a flash device having a maximum deficiency of light amount among flash devices belonging to one group is determined. Next, the maximum deficiencies of light amount of respective groups are compared to one another, and a maximum deficiency among the maximum deficiencies is determined.

In the second calculation process, the camera control unit 39 first initializes target group designating information and target flash device designating information (S401), and calculates, for the target flash device, a light amount deficiency (difference) of the possible light emission amount relative to the final ideal light amount (S402).

As described previously, the final ideal light amount of the target group is represented by a magnification value relative to the light amount of the target group at preliminary light emission (theoretical value). Thus, the final ideal light amount of the target flash device has the same value as the magnification value. Accordingly, the camera control unit 39 is able to determine the difference for the target flash device (the deficiency of possible light emission amount of the target flash device relative to the final ideal light amount) simply by subtracting the possible light emission amount of the target flash device acquired in S207 in FIG. 2 from the final ideal light amount of the target group determined in S309 in FIG. 3.

Figure 2:
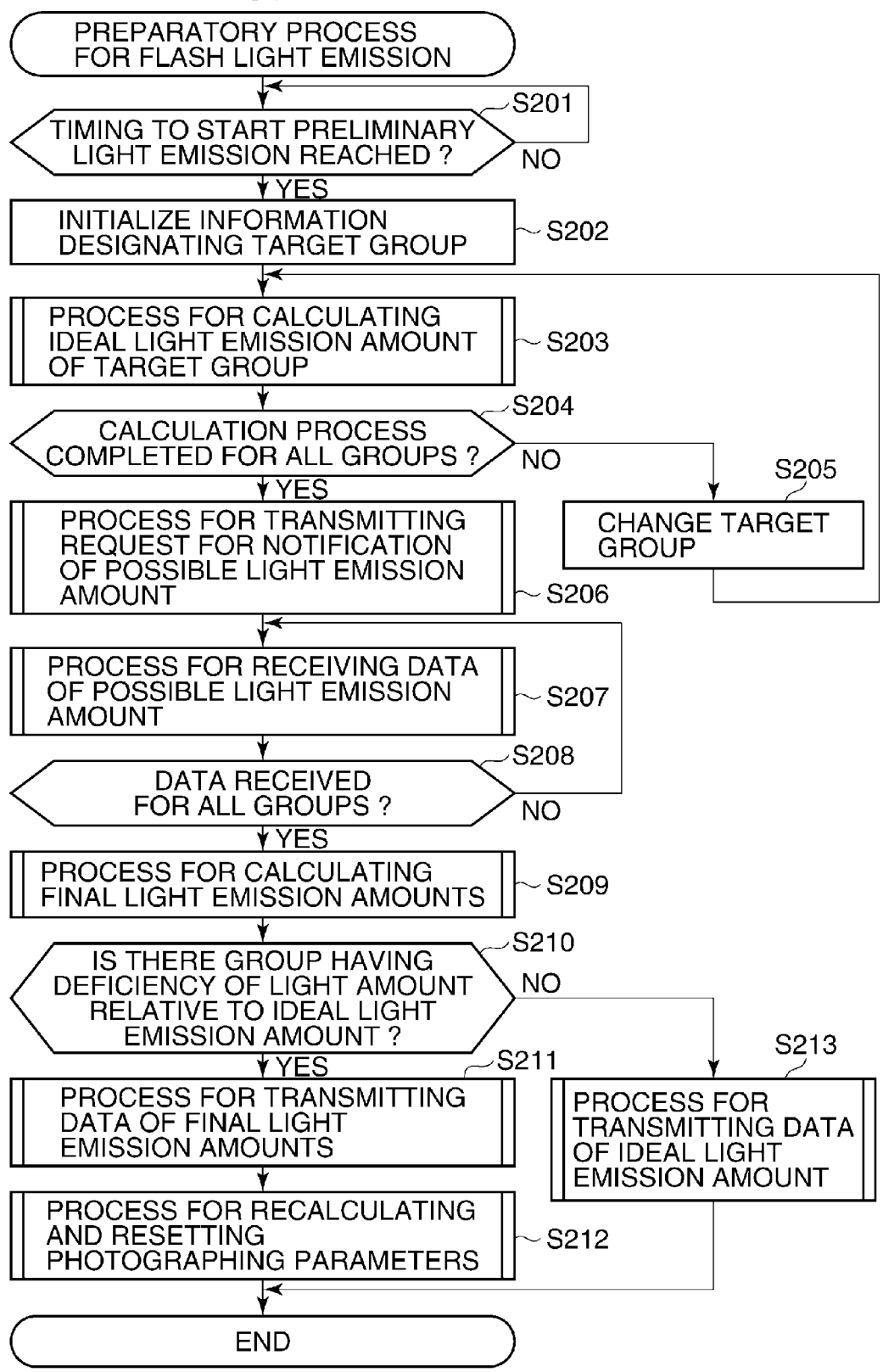
FIG. 2 is a flowchart showing the outline of a preparatory process for flash light emission.

If the possible light emission amount acquired from the flash device in S207 in FIG. 2 is not represented by a magnification value relative to the light amount at preliminary light emission (theoretical value), the camera control unit 39 converts the possible light emission amount into a magnification value and uses the same in the difference calculation in S402.

Next, the camera control unit 39 determines whether the difference calculated in S402 is larger than zero, i.e., determines whether the possible light emission amount of the target flash device has a deficiency relative to the final ideal amount of light emission of the target flash device (S403). If the answer to S403 is YES, the control unit 39 sets the possible light emission amount (magnification value) of the target flash device as a candidate light emission amount of the target flash device (S404).

On the other hand, if the difference is equal to or less than zero and there is no deficiency in the light amount (i.e., if the answer to S403 is NO), the camera control unit 39 sets the final ideal amount of light emission of the target flash device (magnification value) as a candidate light emission amount of the target flash device (S405). As described previously, the final ideal amount of light emission of the target flash device is the same as that of the target group.

Next, the camera control unit 39 determines whether the candidate light emission amount has been set for all the flash devices belonging to the target group (S406). If the answer to S406 is NO, the target flash device is changed in S407 and the flow returns to S402. If the answer to S406 is YES, the flow proceeds to S408.

In S408, a representative difference of the target group is calculated. To this end, the camera control unit 39 extracts the minimum candidate light emission amount from among the candidate light emission amounts of the target group. Then, the control unit 39 subtracts the minimum candidate amount of light emission from the final ideal amount of light emission of the target group (magnification value), thereby calculating a representative difference that represents a deficiency of light amount relative to the final ideal amount of light emission of the target group.

Next, the camera control unit 39 determines whether the representative difference has been calculated for all the groups (S409). If the answer to S409 is NO, the target group is changed in S410 and the flow returns to S402. If the answer to S409 is YES, the flow proceeds to S411.

In S411, the camera control unit 39 sets a maximum deficiency of light amount among deficiencies of light amount (representative differences) of all the groups relative to the final ideal amount of light emission, as a final deficiency of light amount (final difference). Then, the control unit 39 initializes the target group designating information in S412, subtracts the final deficiency of light amount (final difference) set in S411 from the final ideal amount of light emission of the target group, sets the value (magnification value) obtained by the subtraction as the final amount of light emission of the target group (S413), and determines whether the final amount of light emission has been set for all the groups (S414). If the answer to S414 is NO, the target group is changed in S415 and the flow returns to S413. If the answer to S414 is YES, the calculation process in FIGS. 4A and 4B is completed.

Next, with reference to a flowchart of FIG. 5, a detailed description will be given of the process in S213 in FIG. 2 for recalculating and resetting the photographing parameters. In this recalculating and resetting process, currently set photographing parameters are reset based on the maximum deficiency of light amount obtained in S411 in FIG. 4B, so as to compensate for the deficiency of light amount relative to the final ideal amount of light emission.

In this embodiment, the photographing parameters are recalculated and reset in the following order of priority: (i) ISO sensitivity value; (ii) diaphragm value (hereinafter, referred to as the Av value); and (iii) shutter speed value (hereinafter referred to as the Tv value). It should be noted that each of ISO sensitivity value, Av value, and Tv value can be converted into a magnification value relative to the amount of preliminary light emission.

Figure 5:
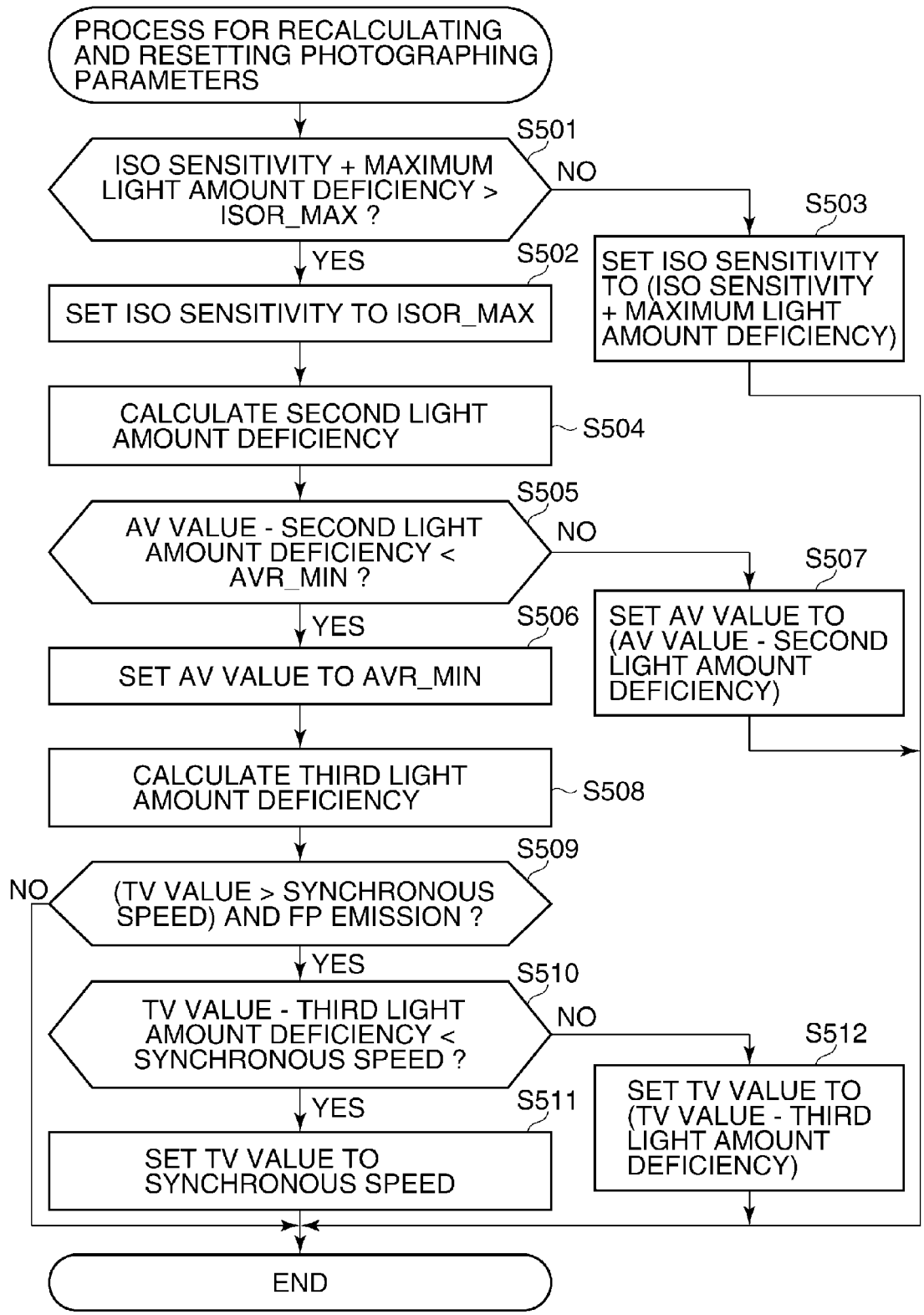
FIG. 5 is a flowchart showing a process for recalculating and resetting photographing parameters in S213 in FIG. 2.

In FIG. 5, the camera control unit 39 first determines in S501 whether a sum value of a currently set photographing ISO sensitivity value (magnification value) and a maximum deficiency of light amount (final difference) exceeds an upper limit value of ISO sensitivity value available in the camera (hereinafter referred to as ISOR_MAX). If it is determined that the sum value does not exceed ISOR_MAX, the sum value is set as a photographing ISO sensitivity (S503). As a result, it becomes possible to perform photographing equivalent to photographing where respective groups emit light at final ideal amounts of light emission. Thus, the camera control unit 39 completes the process for recalculating and resetting the photographing parameters.

On the other hand, if it is determined in S501 that the sum value of the currently set photographing ISO sensitivity value and the maximum deficiency of light amount exceeds ISOR_MAX, the photographing ISO sensitivity value cannot be set to a value higher than ISOR_MAX, and therefore the camera control unit 39 resets the photographing ISO sensitivity value to ISOR_MAX (S502). A deficiency of light amount that can be compensated for by resetting the photographing ISO sensitivity value to ISOR_MAX (i.e., a first deficiency of light amount) is represented by a value obtained by subtracting, from ISOR_MAX, the photographing ISO sensitivity value before being reset.

Next, in S504, the camera control unit 39 subtracts the first deficiency of light amount from the maximum deficiency of light amount, thereby calculating a deficiency of light amount that cannot be compensated for by resetting the photographing ISO sensitivity value to ISOR_MAX (i.e., calculating a second deficiency of light amount). Specifically, the second deficiency of light amount is calculated according to the following formula:

Second deficiency of light amount=Maximum deficiency of light amount−First deficiency of light amount=Maximum deficiency of light amount−ISOR_MAX−Photographing ISO sensitivity value before being reset.

Next, in S505, the camera control unit 39 determines whether a value (magnification value) obtained by subtracting the second deficiency of light amount from a currently set photographing Av value is less than a release Av value (hereinafter, referred to as AVR_MIN), which is decided according to an internal state of the camera and a lens mounted on the camera.

If the answer to S505 is NO, the camera control unit 39 resets the photographing Av value to a value obtained by subtracting the second deficiency of light amount from the currently set photographing Av value (S507). As a result, it becomes possible to perform photographing equivalent to photographing where respective groups emit light at final ideal amounts of light emission. Thus, the camera control unit 39 completes the process for recalculating and resetting the photographing parameters.

On the other hand, if it is determined in S505 that the value obtained by subtracting the second deficiency of light amount from the currently set photographing Av value is less than AVR_MIN, it is impossible to set the Av value to much release side than AVR_MIN, and therefore, the camera control unit 39 resets the photographing Av value to AVR_MIN (S506). An amount of light that can be compensated for by resetting the photographing Av value to AVR_MIN is represented by a value obtained by subtracting AVR_MIN from the photographing Av value before being reset, and the second deficiency of light amount cannot be fully compensated for by resetting the photographing Av value in the above manner.

Thus, the camera control unit 39 calculates a third deficiency of light amount by subtracting, from the second deficiency of light amount, the value obtained by subtracting AVR_MIN from the photographing Av value before being reset (S508).

Next, the camera control unit 39 determines whether a currently set photographing Tv value is on the shutter speed side higher than the strobe synchronous speed and determines whether emission is FP (focal plain) emission which is also called flat emission (S509). Specifically, it is determined whether an amount of light can be increased by changing the setting of shutter speed system.

If the answer to S509 is NO, the camera control unit 39 completes the process for recalculating and resetting the photographing parameters. In that case, photographing not equivalent but close to photographing where respective flash device groups emit light at final ideal amounts of light emission can be performed since the deficiency of light amount is partly compensated for by changing the diagram value in S506 and by changing the ISO sensitivity value in S502.

On the other hand, if it is determined in S509 that an amount of light can be increased by slowing the shutter speed, the camera control unit 39 determines whether a value obtained by subtracting the third deficiency of light amount from the currently set photographing Tv value is on the shutter speed side lower than the strobe synchronous speed (S510).

If the answer to S510 is NO, the camera control unit 39 resets the photographing Tv value to the value obtained by the subtraction (S512). In that case, photographing equivalent to photographing where respective flash device groups emit light at final ideal amounts of light emission can be performed based on photographing Tv value, Av value, and ISO sensitivity value which are reset in S512, S506, and S502, respectively. Thus, the camera control unit 39 completes the process for recalculating and resetting the photographing parameters.

On the other hand, if the value obtained by subtracting the third deficiency of light amount from the currently set photographing Tv value is on the low shutter speed side lower than the strobe synchronous speed (i.e., if the answer to S510 is YES), the camera control unit 39 resets the photographing Tv value to a shutter speed value corresponding to the strobe synchronous speed (S511), and the process for recalculating and resetting photographing parameters is completed. In that case, photographing not guaranteed to be equivalent but much close to photographing where respective groups emit light at final ideal amounts of light emission can be performed.

It should be noted that photographing parameters which are objects of setting change are not set to values as set by the user, but set to optimum values determined according to, e.g., results of photometric measurement and adjustment and based on values set by the user.

However, these photographing parameters can be set to values set by the user. The photographing parameter values are only temporarily changed, where required, at the time of multiple flash photographing, and returned to their previous values upon completion of multiple flash photographing.

Next, with reference to a flowchart of FIG. 6, the transmission process in S206, S211, and S213 in FIG. 2 will be described in detail below. The transmission process is executed by the flash controller 55 of the master flash device M under the control of the camera control unit 39. This also applies to the reception process in FIG. 7.

In the transmission process, the flash controller 55 receives from the camera control unit 39 a command for transmitting a request to slave flash devices 153 (S601), and sets a device ID of one slave flash device 153 which is a transmission destination (S602). Next, the flash controller 55 sets, in a transmission buffer, transmission data and/or a command to be transmitted to the slave flash device 153 (S603).

At that time, the flash controller 55 sets data representing the final amount of light emission and a command for requesting reception of the data in the case of the transmission process in S211 in FIG. 2, sets data representing the final ideal amount of light emission and a command for requesting reception of the data in the case of the transmission process in S213, and sets a command for requesting a notification of possible light emission amount in the case of the transmission process in S206. Next, in S604, the flash controller 55 starts transmitting the data and/or the command set in S603 to the transmission destination set in S602, and determines whether the transmission is completed (S605).

When determining in S605 that the transmission to the slave flash device is completed, the flash controller 55 determines whether transmission has been completed for all the slave flash devices 153 requested by the camera control unit 39 (S606). If the answer to S606 is NO, the transmission object device is changed in S607 and the flow returns to S602. If the answer to S606 is YES, the transmission process of FIG. 6 is completed.

Next, the reception process in S207 in FIG. 2 will be described in detail with reference to a flowchart in FIG. 7.

In the reception process, the flash controller 55 of the master flash device M receives reception data and/or commands (data representing possible light emission amounts in this example) sent back from respective slave flash devices 153 in response to the command for requesting a notification (the command for requesting a notification of possible light emission amount in this example), and stores the received data and/or commands into a reception buffer.

When determining in S701 that data and/or commands have been received from the slave flash devices 153, the flash controller 55 acquires the data and/or commands (the data representing possible light emission amounts of the slave flash devices in this example) from the reception buffer (S702), analyzes the acquired data and/or commands (S703), and transfers the data and/or commands to the camera control unit 39 (S704).

Next, a process performed by each of the slave flash devices 153 will be described with reference to a flowchart in FIG. 8.

In FIG. 8, the controller of each slave flash device 153 (hereinafter, referred to as the controller) receives a command (including data) from the master flash device M and stores the received command into a reception buffer (S801), and determines whether the received command is a command for requesting preliminary light emission (S802). Then, the controller performs a process specified by the received command.

Specifically, when determining in S802 that the received command is a command for requesting preliminary light emission, the controller performs preliminary light emission (S803). If the answer to S802 is NO, the controller determines whether the received command is a command for notification of light emission amount (S804). If the answer to S804 is YES, the controller sets a notified amount of light emission (final amount of light emission or ideal amount of light emission) as a light emission amount at the time of main light emission (S805).

If the answer to S804 is NO, the controller determines whether the received command is a command for requesting a notification of possible light emission amount (S806). If the answer to S806 is YES, the controller calculates a possible light emission amount based on a charge voltage of a strobe light emission capacitor of the slave flash device 153 (S807), and notifies the master flash device M of the calculated possible light emission amount (S808).

If the received command is not any of the command for requesting preliminary light emission, the command for notification of light emission amount, and the command for requesting a notification of possible light emission amount, the controller performs a process specified by the received command (S809). After the process specified by the received command is performed by the controller, the flow returns to S801.

As described above, if there is a slave flash device unable to emit a set amount of light, amounts of light emission of respective flash devices are re-calculated based on a possible light emission amount of the slave flash device, to thereby maintain light amount ratios at the time of multiple flash photographing. In addition, if there is a slave flash device unable to emit a set amount of light, photographing parameters having been set to correspond to light emission amounts before the re-calculation are reset so as to correspond to light emission amounts after the re-calculation, to thereby compensate for a deficiency of light amount.

It should be noted that this invention is not limited to the above described embodiment. For example, the master flash device and the slave flash devices may be configured to perform bi-directional communication not via wireless communication but via wired communication.

The preparatory process for flash light emission in the embodiment may be performed not under the initiative of the camera control unit 39 of the camera body but under the initiative of, e.g., the flash controller 55 of the master flash device. Further, the entire preparatory process for flash light emission can be performed by only the camera body or by only the flash device.

In the above described embodiment, bi-directional wireless communication with the slave flash devices is performed via the external flash device attached as the master flash device to the camera body. Alternatively, communication with the slave flash device can be performed using a wireless communication circuit built in the camera body or can be performed via a wireless communication device, which is attached to the camera body.

In the embodiment, light emission devices each having a light source for flash light emission are used as the flash devices. Alternatively, light emission devices, such as LEDs, each having a light source that does not emit flash light can be used.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-089064, filed Apr. 1, 2009, which is hereby incorporated by reference herein in its entirety.

What is claimed is:

1. An image pickup apparatus adapted for bi-directional communication with a plurality of light emission devices via a communication unit, comprising:
    a light measurement unit configured to measure object brightness;
    a first calculation unit configured to calculate first light emission amounts of the plurality of light emission devices based on a result of measurement by said light measurement unit;
    an acquisition unit configured to acquire data representing possible amounts of light emission of the plurality of light emission devices;
    a second calculation unit configured, in a case where the plurality of light emission devices include one whose possible amount of light emission represented by the data acquired by said acquisition unit is smaller than the first light emission amount, to calculate second light emission amounts at which light amount ratios of the plurality of light emission devices become equal to light amount ratios at the first light emission amounts, based on the possible amount of light emission smaller than the first light emission amount and having a maximum difference from the first light emission amount; and a control unit configured, in a case where the plurality of light emission devices include one whose possible amount of light emission is smaller than the first light emission amount, to control the plurality of light emission devices so as to emit light at the second light emission amounts.

2. The image pickup apparatus according to claim 1, comprising:
a change unit configured to change a photographing parameter, which has been set to correspond to the first light emission amounts, so as to compensate for differences between the first light emission amounts and the second light emission amounts.

3. The image pickup apparatus according to claim 1, wherein said first calculation unit calculates the first light emission amounts at which light amount ratios set for the plurality of light emission devices are maintained.

4. The image pickup apparatus according to claim 2, wherein said change unit changes at least one of an ISO sensitivity, a shutter speed, and a diaphragm value, which serve as the photographing parameter.

5. The image pickup apparatus according to claim 2, wherein said change unit changes, in an order of priority, an ISO sensitivity, a shutter speed, and a diaphragm value, which serve as the photographing parameter.

6. A light emission device adapted for bi-directional communication with a plurality of light emission devices via a communication unit, comprising:
a light emission unit;
a light emission control unit configured to control light emission of said light emission unit;
a connection unit configured to be connected to an image pickup apparatus;
a transmission unit configured to transmit to the plurality of light emission devices a request from the image pickup apparatus connected to said connection unit; and
a reception unit configured to receive, from the plurality of light emission devices, data representing possible amounts of light emission of respective ones of the plurality of light emission devices,
wherein said transmission unit transmits, to the plurality of light emission devices, data representing light emission amounts calculated based on the data representing the possible amounts of light emission received by said reception unit from the plurality of light emission devices, and
said light emission control unit causes said light emission unit to emit light, in synchronism with light emissions of the plurality of light emission devices, at a light emission amount calculated based on the possible amounts of light emission.

7. An image pickup system having a plurality of light emission devices adapted for bi-directional communication with an image pickup apparatus via a communication unit, comprising:
a light measurement unit configured to measure object brightness;
a first calculation unit configured to calculate first light emission amounts of the plurality of light emission devices based on a result of measurement by said light measurement unit;
an acquisition unit configured to acquire data representing possible amounts of light emission of the plurality of light emission devices;
a second calculation unit configured, in a case where the plurality of light emission devices include one whose possible amount of light emission represented by the data acquired by said acquisition unit is smaller than the first light emission amount, to calculate second light emission amounts at which light amount ratios of the plurality of light emission devices become equal to light amount ratios at the first light emission amounts, based on the possible amount of light emission smaller than the first light emission amount and having a maximum difference from the first light emission amount; and
a control unit configured, in a case where the plurality of light emission devices include one whose possible amount of light emission is smaller than the first light emission amount, to control the plurality of light emission devices so as to emit light at the second light emission amounts.

* * * * *